United States Patent [19]

Olsen et al.

[11] Patent Number: 5,630,700
[45] Date of Patent: May 20, 1997

[54] FLOATING VANE TURBINE NOZZLE

[75] Inventors: Andrew J. Olsen, Amesbury; William L. Blair, Danvers, both of Mass.

[73] Assignee: General Electric Company, Cincinnati, Ohio

[21] Appl. No.: 638,094

[22] Filed: Apr. 26, 1996

[51] Int. Cl.$^6$ ..................................................... F01D 25/26
[52] U.S. Cl. ........................ 415/134; 415/135; 415/209.2
[58] Field of Search ............................ 415/209.3, 209.4, 415/115, 209.2, 134, 135

[56] References Cited

U.S. PATENT DOCUMENTS

| | | | |
|---|---|---|---|
| 4,214,851 | 7/1980 | Tuley et al. | 415/115 |
| 4,288,201 | 9/1981 | Wilson | 415/115 |
| 5,411,370 | 5/1995 | Varsik | 415/209.4 |
| 5,488,825 | 2/1996 | Davis et al. | 415/115 |
| 5,494,404 | 2/1996 | Furseth et al. | 415/209.4 X |

OTHER PUBLICATIONS

Steinetz et al, "High Temperature Hypersonic Engine Seal Technology Development Solid Seal/Material Evaluation," 1993 National AeroSpace plan, Mid–Term Technology Review, Apr. 13–16, 1993, Paper No. 114, pp: cover & 10.
Technetics Corp., "TC–3300 High Temperature Fiber Metal Materials," 2 pages.
Technetics Corp., "TC–881 Feltmetal Fiber Metal Products, "0 1993, two pages.
Technetics Corp., "Feltmetal Seals TC800," 1993, four pages.

Primary Examiner—John T. Kwon
Attorney, Agent, or Firm—Andrew C. Hess; Wayne O. Traynham

[57] ABSTRACT

A turbine nozzle includes outer and inner bands having respective mounting holes therein. A plurality of vanes extends through respective pairs of outer and inner holes in the bands. The vane outer and inner ends are resiliently supported to the bands to allow differential thermal movement therebetween so that the individual vanes float relative to the outer and inner bands to prevent thermal stress failure thereof.

19 Claims, 3 Drawing Sheets

FLOATING VANE TURBINE NOZZLE

The U.S. Government has rights in this invention in accordance with Contract No. F33615-90-C-2006 awarded by the Department of the Air Force.

BACKGROUND OF THE INVENTION

The present invention relates generally to gas turbine engines, and, more specifically, to turbine nozzles therein.

In a gas turbine engine, air is compressed in a compressor, mixed with fuel and ignited in a combustor for generating hot combustion gases which flow downstream through one or more turbine stages which extract energy therefrom for powering the engine. A high pressure turbine (HPT) powers the compressor of the core engine, and a low pressure turbine (LPT) is disposed downstream from the HPT for powering a fan, for example. Each turbine stage includes a stationary turbine nozzle followed in turn by a row of rotor blades mounted to the perimeter of a rotor disk.

The HPT nozzle is mounted at the exit of the combustor and therefore receives the hottest temperature combustion gases therefrom. Accordingly, the turbine nozzle is specifically configured for channeling therethrough a portion of the compressor air which is bled therefrom for cooling the turbine nozzle for obtaining a suitable useful life thereof during operation. The nozzle vanes are hollow airfoils extending radially between outer and inner bands which support the vanes. Various conventional configurations exist for suitably cooling both the vanes and the bands, with impingement and film cooling typically being used for providing cooling of these components. To effect impingement cooling, each of the bands includes an impingement baffle in the form of a perforated plate through which bleed air is channeled for impingement against the outer surface of the bands for the cooling thereof. One or more perforated hollow inserts are suitably mounted within each of the vanes for directing impingement air against the inner surface of the vanes for impingement cooling thereof.

During operation, the hot combustion gases flow around each of the nozzle vanes between the outer and inner bands. Accordingly, the turbine nozzle thermally expands upon being heated, and contracts when temperatures are reduced. Furthermore, significant temperature gradients exist along the vanes and bands due to heating by the combustion gases and cooling by the bleed air. The temperature gradients and differential thermal movement of the nozzle components result in thermally induced strain and stress which must be kept within suitable limits for obtaining a useful life of the nozzle during operation.

Each nozzle is an annular structure with the outer and inner bands typically being formed in arcuate segments to eliminate the hoop restraint which would otherwise be caused by continuous rings. Each vane is fixedly joined at outer and inner ends thereof to the outer and inner bands by brazing or being integrally cast therewith. Continuous outer and inner bands joined by the vanes would create excessive thermal strain and stress due to differential expansion and contraction thereof providing a reduced low cycle fatigue life. Dividing the outer and inner bands into a suitable number of segments with two or more vanes per segment significantly reduces thermally induced stress, but increases the complexity of the turbine nozzle since suitable seals must then be provided between the individual nozzle segments to prevent undesirable leakage therethrough.

Even in a nozzle segment having two vanes fixedly joined to the outer and inner band segments, differential thermal movement between the components nevertheless results in thermally induced strain and stress which affects the useful life of the nozzle. However, since the bands and vanes are typically formed of the same or similar high temperature metal or material, the thermal coefficients of expansion, and thermal conductivity, thereof are correspondingly the same which reduces the thermally induced stress therefrom.

Since the overall efficiency of the gas turbine engine is directly related to the temperature of the combustion gases, engine efficiency is limited by the ability to operate the turbine nozzle at high temperature. Present nozzle materials are superalloys, such as single crystal nickel based materials, which have allowed engines to be operated at relatively high thermal efficiency. Further advances in engine efficiency require further increase in combustion gas temperature which cannot be obtained using conventional superalloys and conventional cooling techniques.

Accordingly, advanced, high temperature materials are being developed for use in turbine engines. One class of these high temperature materials is referred to as intermetallic, and includes for example nickel aluminide (NiAl) superalloys which have even higher temperature capability than that of in-service superalloys. They enjoy higher melting temperature while maintaining strength at higher temperatures. And they have substantially higher thermal conductivity which enhances cooling and reduces hot spots.

Another class of advanced high temperature material is referred to as ceramic matrix composite (CMC) which also has substantially higher temperature capabilities than conventional superalloys. CMC materials also maintain strength at relatively higher temperature than that of conventional superalloys.

However, both of these advanced materials are relatively brittle when compared to conventional superalloys, with a corresponding loss of toughness inherent therein. These materials also have substantially different coefficients of thermal expansion, or different thermal conductivities, compared to conventional superalloys. If these materials were conventionally fixedly joined to conventional nozzle outer and inner bands, they would fail prematurely during operation due to thermal stress since the restraint imposed by the bands on the relatively brittle vanes would cause them to fail upon differential thermal movement due to expansion or contraction therebetween. The differential thermal movement is caused by difference in coefficients of thermal expansion or difference in thermal conductivities during thermal transient operation. In order to effectively utilize these advanced high-temperature, but brittle, materials in a gas turbine engine, an improved turbine nozzle configuration is required.

SUMMARY OF THE INVENTION

A turbine nozzle includes outer and inner bands having respective mounting holes therein. A plurality of vanes extend through respective pairs of outer and inner holes in the bands. The vane outer and inner ends are resiliently supported to the bands to allow differential thermal movement therebetween so that the individual vanes float relative to the outer and inner bands to prevent thermal stress failure thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
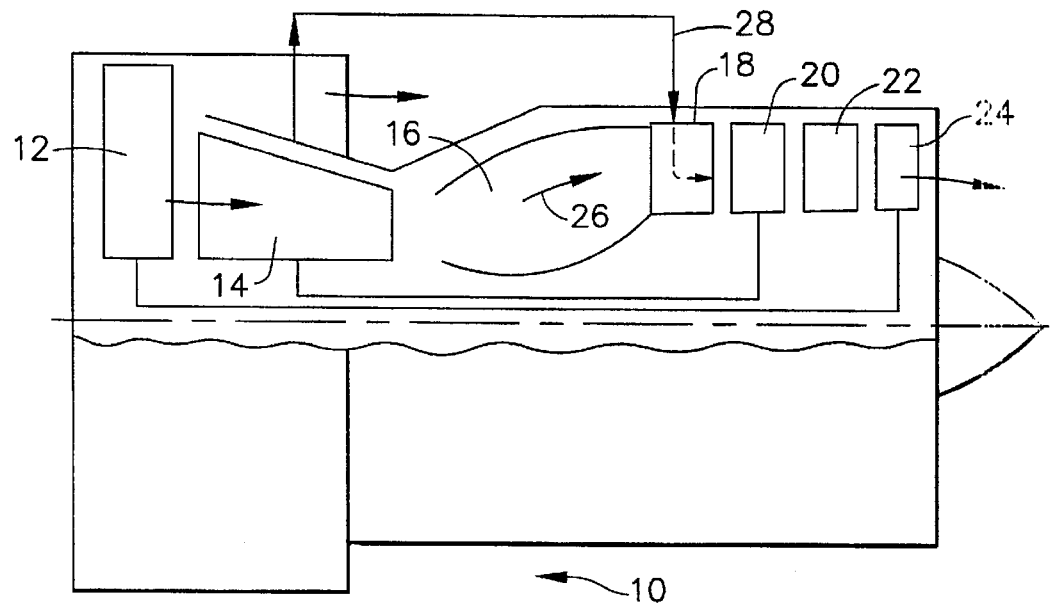
FIG. 1 is a schematic representation of an exemplary aircraft turbofan gas turbine engine including a high pressure turbine nozzle in accordance with one embodiment of the present invention.

Illustrated schematically in FIG. 1 is an exemplary aircraft turbofan gas turbine engine 10 which includes in serial flow communication a fan 12, compressor 14, combustor 16, high pressure turbine (HPT) nozzle 18 and rotor 20, and a low pressure turbine (LPT) nozzle 22 and rotor 24. The HPT rotor 20 is joined to the compressor 14 by a shaft, and the LPT rotor 24 is joined to the fan 12 by another shaft. Except for the nozzles 18 and 22, the engine 10 is otherwise conventional in construction and operation.

Air is compressed in the compressor 14 and mixed with fuel in the combustor 16 and ignited for generating hot combustion gases 26 which flow downstream through the HPT and LPT which extract energy therefrom for powering the engine. The engine also includes a conventional bleed air system which bleeds a portion of the compressed air from the compressor 14 as bleed air designated 28 which is used for cooling the HPT nozzle 18 during operation, with other portions of the bleed air being used for cooling the other components of the turbines in conventional manners.

Figure 2:
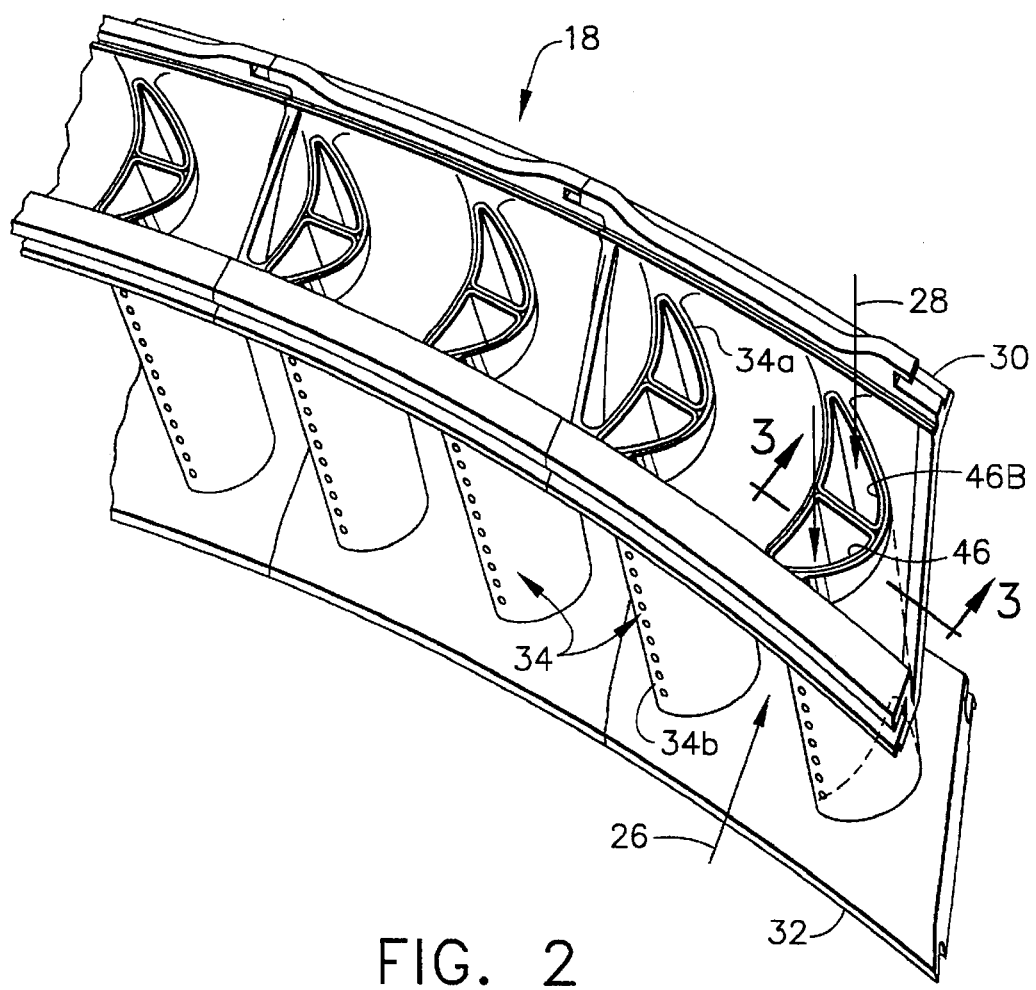
FIG. 2 is an isometric view of a portion of the high pressure turbine nozzle illustrated in FIG. 1 showing nozzle vanes mounted between outer and inner bands.

FIG. 2 illustrates a portion of the HPT turbine nozzle 18 in accordance with one embodiment of the present invention, with it being understood that the LPT nozzle 22 may be similarly configured if desired. The nozzle 18 includes a radially outer band 30 which is circumferentially segmented in the exemplary embodiment illustrated in FIG. 2, and a radially inner band 32 which is spaced radially inwardly from the outer band 30, and is similarly circumferentially segmented in an equal number of segments. A plurality of hollow vanes 34 extend radially between the outer and inner bands 30, 32, with two vanes 34 being mounted to each of the band segments in this exemplary embodiment.

In accordance with the present invention, the vanes 34 are resiliently mounted to the outer and inner bands so that they may be made of high-temperature capability, relatively brittle materials for improving the overall efficiency of the engine 10 without experiencing thermal stress damage during operation in the engine. The outer and inner bands 30, 32 are preferably formed of conventional materials such as single crystal, nickel based superalloy typically used for turbine nozzle bands. In conventional turbine nozzles, the vanes 34 would also be formed of the same or similar nickel based superalloy so that these components would have substantially equal coefficients of thermal expansion and thermal conductivity for reducing thermally induced strain and stress during operation.

In accordance also with the present invention, it is desired to form the vanes 34 of advanced high temperature materials having higher temperature capability and corresponding strengths, including creep and rupture, than those of the bands 30, 32. This will allow an increase in the operating temperature of the combustion gases 26 which flow over the vanes 34 for increasing the overall efficiency of the engine 10 while still obtaining a suitable useful life for the turbine nozzle 18 during operation.

Figure 3:
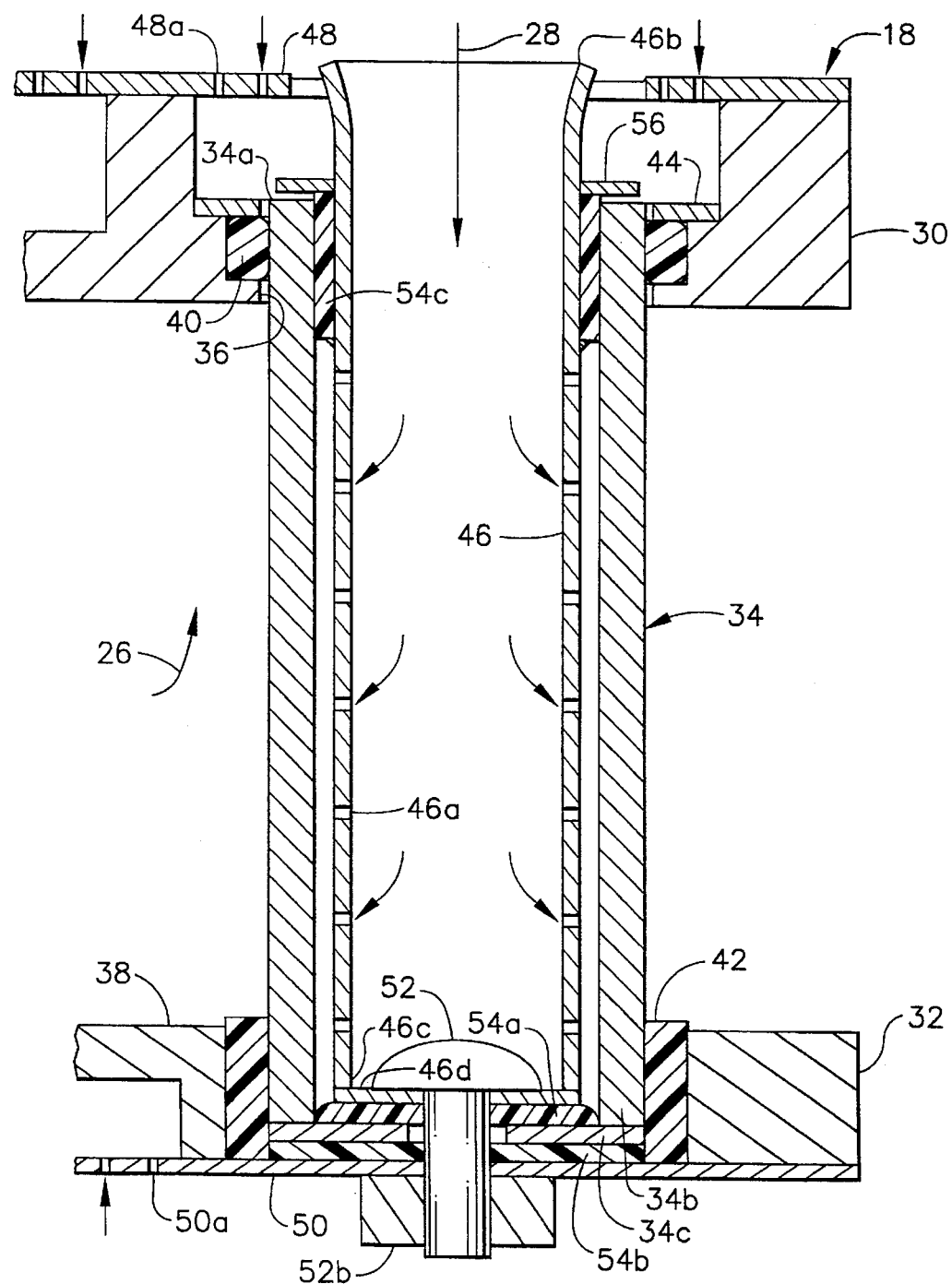
FIG. 3 is an elevational, partly sectional view through one of the vanes illustrated in FIG. 2 taken along line 3—3, and mounted between outer and inner bands in accordance with one embodiment of the present invention including outer and inner seals supporting corresponding ends of the vanes.

In the exemplary embodiment illustrated in FIGS. 2 and 3, the vanes 34 are preferably formed of a high temperature intermetallic alloy such as nickel-aluminide (NiAl) which may take any suitable form. The intermetallic material has a higher melting temperature and strength than that of the nickel-based superalloy forming the bands 30, 32, and also has a higher thermal conductivity for enhancing cooling effectiveness while reducing hot spots. However, the intermetallic material of the vanes 34 is relatively brittle as compared to the bands 30, 32. The NiAl material has a coefficient of thermal expansion of about $7-8.5 \times 10^{-6}$ in/in/°F., which compares to about $6.3-9.2 \times 10^{-6}$ in/in/°F. for the bands 30, 32.

Most significantly, NiAl material has a higher thermal conductivity of 24–48 BTU/hr-ft-°F. versus 13–16 BTU/hr-ft-°F. for the bands 30,32, which causes the vanes 34 to heat up even faster and expand quicker than the bands or than conventional vanes. If the intermetallic vanes 34 were conventionally brazed or cast with the outer and inner bands 30, 32, they would quickly fail during operation by thermal stress due to the differential thermal movement, or expansion or contraction, between the vanes and bands during transient operation.

The vanes 34 are mounted to the outer and inner bands 30, 32 in accordance with the invention to allow them to float relative thereto and prevent undesirable restraint thereof or point loads thereon which would cause them to fail during operation. In the exemplary embodiment illustrated in FIG. 3, each of the outer bands 30 includes a plurality of circumferentially spaced apart outer mounting holes 36, and the inner band 32 similarly includes a plurality of circumferentially spaced apart inner mounting holes 38 which are radially or vertically aligned with respective ones of the outer holes 36. Each of the vanes 34 extends through a respective pair of the outer and inner holes 36, 38, with each vane 34 having radially outer and inner ends 34a and 34b correspondingly disposed at the same radial position as the respective outer and inner mounting holes 36, 38.

Each of the vanes 34 is conventional in shape, although being formed of the improved material, and may include any conventional cooling features such as the film cooling holes illustrated in FIG. 2. The vanes 34 may be relatively simple in configuration since they are mounted in accordance with the present invention for floating without restraint between the outer and inner bands 32.

As shown in FIG. 3 in accordance with one embodiment, means are disposed in abutting contact between the vane outer and inner ends 34a,b and the corresponding outer and inner holes 36, 38 for resiliently supporting the vanes 34 to the bands 30, 32 and allowing substantially unrestrained differential thermal movement therebetween. The vane supporting means are effective for allowing differential thermal movement including expansion and contraction between the vanes 34 and the bands 30, 32 both radially or longitudinally, and laterally, which includes the circumferential and axial directions relative to the engine 10, to prevent hard or point-load mounting of the individual vanes 34.

In the exemplary embodiment illustrated in FIG. 3, the vane supporting means include a radially outer collar 40 which is preferably a one-piece annular member generally in the form of an O-ring surrounding each of the vane outer ends 34a in each of the corresponding outer holes 36. The outer collar 40 tightly encircles the outer perimeter of the vane outer end 34a in laterally abutting contact with the inner surface of the outer mounting hole 36 for centering the vane outer end 34a therein. The outer collar 40 not only supports the vane outer end 34a, but also provides a fluid seal which maintains the cooling air 28 and the combustion gases 26 on opposite sides of the outer band 30.

The vane supporting means also include a radially inner collar 42 surrounding each of the vane inner ends 34b in each of the corresponding inner holes 38. The inner collars 42 are preferably also one-piece annular members in the form of O-rings which encircle the outer perimeter of the vane inner end 34b in laterally abutting contact with the inner surface of the inner mounting holes 38 for centering the vane inner end 34b therein. The inner collar 42 not only supports the vane inner end 34b but also provides a seal between the vane and the inner band 32.

The primary function of the outer and inner collars 40, 42 is to resiliently support the vanes 34 in the outer and inner bands 30, 32. The collars 40, 42 are configured for suitable stiffness for carrying to the outer and inner bands 30, 32 reaction loads experienced by the vanes 34 by the combustion gases 26 flowing thereover during operation. The collars 40, 42 are also suitably resilient or compliant for allowing substantially unrestrained differential thermal movement between the vanes 34 and the bands 30, 32 during and in operation. Since the collars 40, 42 simply abut the outer surface of the vanes 34, they allow unrestrained radial movement of the vanes 34 by sliding relative to the collars and the bands 30, 32. In the lateral circumferential and axial directions, the collars 40, 42 are suitably resilient to allow the vanes 34 to expand or contract relative to the mounting holes 36, 38. In this way, excessive restraint of the thermal movement of the vanes 34 which would cause thermal stress thereof is eliminated.

Figure 4:
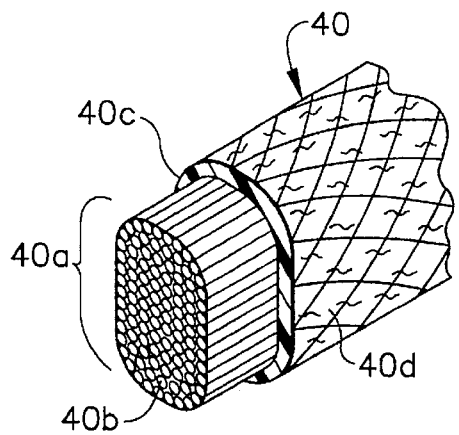
FIG. 4 is an isometric, partly sectional view of a portion of the outer seal illustrated in FIG. 3 in the form of a rope seal.

In the preferred embodiment illustrated in FIG. 3, the outer or inner collars 40, 42 may be in the form of a rope seal shown in more particularity in an exemplary embodiment in FIG. 4 having a core 40a of bundled, parallel ceramic fibers 40b surrounded by an outer sheath 40c of suitably braided metal fibers 40d. Suitable rope seals have been tested by NASA-Lewis and referred to as hybrid seals, with the sheath 40c being formed of conventional HS188 or IN600 superalloy metal fibers, and the core 40a of Nextel 312 or 440 ceramic fibers. In a preferred embodiment, the core is formed of Nextel 550 ceramic fibers. The rope seals 40 have high temperature capability for use in the gas turbine engine high pressure turbine nozzle 18, with suitable resilience or compliance for supporting the brittle vanes 34 in the outer and inner bands 30, 32. The rope seal configuration of the outer collar 40, or for the inner collar 42, is preferred since it has relatively small leakage when initially preloaded in compression between the vane 34 and the corresponding band. The braided sheath 40c however, allows a small amount of cooling air leakage therethrough which is desirable for cooling the seal during operation.

However, the exemplary embodiment illustrated in FIG. 3 is configured for a specific engine application wherein insufficient space exists for suitably mounting a rope seal in the inner band 32. As shown in FIG. 3, the outer rope seal 40 is preferably trapped in a corresponding recess formed therefor, with a suitable metallic cap 44 being fixedly joined to the outer band 30, by welding for example, for retaining the outer collar 40 in a corresponding U-shaped recess.

Figure 5:
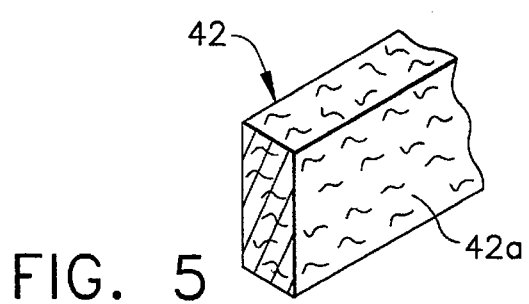
FIG. 5 is an isometric, partly sectional view of a portion of the inner seal illustrated in FIG. 3 in the form of a felt of metal fibers.

Instead of using a rope seal for the inner collar 42 in the embodiment illustrated in FIG. 3, the inner collar 42 is in the form of a felt of sintered metal fiber 42a as illustrated in more particularity in FIG. 5. Suitable Feltmetal (TM) seals may be obtained from the Technetrics Corporation of DeLand, Fla. For the high temperature requirements of a gas turbine engine high pressure turbine nozzle 18, a feltmetal inner collar 42 comprising FeCrAlY metallic fiber of about 20 microns in diameter, with 20% density and light sintering may be used. As shown in FIG. 3, the inner collar 42 has a generally rectangular cross section and completely fills the space between the vane inner end 34b and the inner mounting hole 38. The outer collar 40, in contrast, has a generally circular cross section which is compressed into an oblong shape when mounted between the vane outer end 34a and the outer mounting hole 36.

Both the outer and inner collars 40, 42 are preferably preloaded in compression by the vane 34 to ensure a secure and sealed interface therebetween. Since the feltmetal inner collar 42 has porosity, it will allow some leakage therethrough which may be tolerated, or prevented by providing suitable containment of the inner collar 42 itself if desired. Although either or both of the outer and inner collars 40, 42 may take either the rope seal or feltmetal seal configuration, rope seals for both locations are preferred if sufficient space exists for suitably mounting the rope seals.

The vanes illustrated in FIGS. 2 and 3 are hollow and preferably are impingement cooled by a portion of the bleed air 28. Various impingement cooling configurations may be used with the vane 34 such as one or more hollow impingement air inserts 46, with a second impingement air insert 46B also being used in the exemplary embodiment. Both the first insert 46 and the second insert 46B are disposed inside each of the vanes 34 and have a plurality of spaced apart impingement air holes 46a therein as shown in FIG. 3 for impinging the bleed air 28 against the inner surface of the vanes 34 for conventional impingement cooling thereof. The impingement inserts 46 are preferably formed of a suitable and conventional metal like Inconel 718, and must be suitably mounted for preventing damage to the brittle vanes 34. Accordingly, suitable means are provided for mounting the inserts 46 to the outer and inner bands 30, 32 and allowing substantially unrestrained differential thermal movement between the vanes 34 and the inserts 46, 46B.

In the exemplary embodiment illustrated in FIG. 3, the insert mounting means are effective for allowing differential thermal movement between the vanes 34 and the inserts 46 both radially or longitudinally, and laterally, including the circumferential and axial directions, to prevent hard or point-loading which would damage the vanes 34. Each of the inserts 46 includes radially spaced part outer and inner ends 46b and 46c. And the insert mounting means are effective to fixedly join at least one of the insert outer and inner ends 46b,c to corresponding ones of the outer and inner bands 30, 32.

In the preferred embodiment illustrated in FIG. 3, the nozzle 18 includes radially outer and inner covers or baffles 48 and 50 which may include conventional impingement air holes 48a and 50a, and are suitably fixedly joined to respective ones of the outer and inner bands 30, 32 on their outer or outside surfaces for impingement cooling thereof in a conventional manner. The insert mounting means preferably fixedly mount the inserts 46 to at least one of the outer and inner baffles 48, 50.

In the FIG. 3 embodiment, only the insert inner end 46c is fixedly mounted to the inner baffle 50, with the insert outer end 46b being cantilevered or freely supported. In this embodiment, each of the vanes 34 includes an inner endcap 34c fixedly joined, by brazing for example, to the inner end 34b thereof. The endcap 34c is preferably formed of a conventional superalloy like Haynes 214, and is thin and flexible. Similarly, each of the inserts 46 includes an inner endcap 46d fixedly joined, by brazing for example, to the inner end 46c thereof, and is formed of a similar insert material.

The insert mounting means further include a pin 52 extending through and fixedly joining together the vane and insert endcaps 34c and 46d and the inner baffle 50. A suitable washer 52b surrounds the distal end of the pin 52 and is suitably welded or brazed thereto so that the head of the pin 52 and the washer 52b sandwich and trap together the insert 46, vane 34, and inner baffle 50. In one embodiment, the vane endcap 34c may be formed of a different material than that of the vane 34 itself for being sufficiently resilient or compliant so that the reactions loads due to the pin 52 do not damage the vane 34.

In the preferred embodiment illustrated in FIG. 3, a pair of first and second resilient gaskets 54a and 54b are sandwiched between the insert endcap 46d and the vane endcap 34c, and between the vane endcap 34c and the inner baffle 50, respectively. The first and second gaskets 54a,b may be formed of the same feltmetal material as that of the inner collars 42 for providing sufficient resiliency for allowing substantially unrestrained differential thermal movement of the vane endcap 34c, and vane 34 attached thereto, relative to the mating components. The vane endcap 34c has a relatively large central aperture providing sufficient clearance around the pin 52 for preventing contact therewith, and allowing the vane endcap 34 to slide laterally under differential thermal movement relative to the feltmetal gaskets 54a,b to form a compliant radial restraint.

Since the insert outer end 46b is cantilevered in this exemplary embodiment, a third feltmetal collar or gasket 54c is sandwiched between the outer surface of the insert 46 and the inner surface of the vane 34 at the vane outer end 34a to constrain the insert outer end 46b and prevent damaging contact with the vane 34, and to form an air seal therebetween. The third gasket 54c may be brazed or welded to the insert 46 and may include a cap 56 suitably fixedly joined thereto for reducing leakage through the feltmetal gasket 54c. In the event the second insert 46B illustrated in FIG. 2 is used in addition to the first insert 46, it may be identically mounted within the vane 34 like the arrangement shown in FIG. 3.

The exemplary mounting configuration illustrated in FIG. 3 allows the high temperature capability vanes 34, which are brittle relative to the outer and inner bands 30, 32, to be resiliently mounted thereto for reducing thermal stress in the vanes 34 and resulting damage thereto. The bands 30, 32 are formed of conventional metallic superalloy for providing suitable strength in the turbine nozzle configuration, while providing a suitable load bearing structure for carrying the aerodynamic load from the vanes 34 into the engine frame. Although the intermetallic vanes 34 have a substantially different thermal conductivity than that of the outer and inner bands 30, 32, the resilient mounting thereof allows substantially unrestrained differential thermal movement therebetween notwithstanding the difference in thermal coefficients of expansion and differences in operating temperature.

Figure 6:
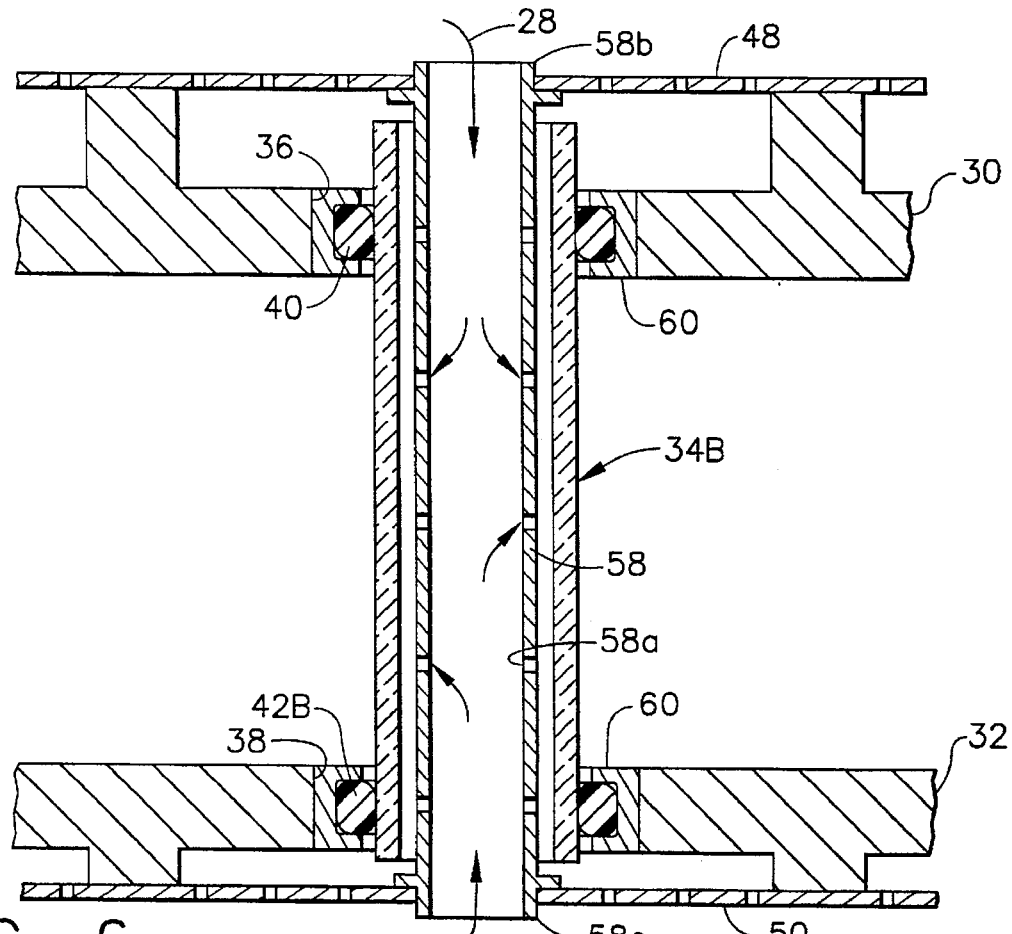
FIG. 6 is an elevational, partly sectional view of a portion of another turbine nozzle in accordance with a second embodiment of the present invention having continuous, annular outer and inner bands, with ceramic matrix composite vanes being mounted therein by a pair of outer and inner rope seals.

In an alternate structural and material configuration of the invention as illustrated in FIG. 6, the vanes, designated 34B, may be formed of a different high temperature capability material such as ceramic matrix composite (CMC) of any suitable composition. Ceramic materials maintain strength capability at higher temperature than conventional superalloys such as those used in the outer and inner bands 30, 32, but like the intermetallic material of the vanes 34 are also brittle and subject to thermal stress if rigidly mounted in a turbine nozzle. CMC material used for the vanes 34B has a range of thermal conductivity of about 7–15 BTU/hr-ft-°F. However, the coefficient of thermal expansion is substantially different than that of the outer and inner bands 30,32, with a value of about $1-3\times10^{-6}$ in/in/°F., for example. This value is substantially less than that of the nickel based superalloy bands 30,32, and causes differential thermal movement during transient operation. Accordingly, the CMC vanes 34B are resiliently supported in accordance with the present invention to accommodate this movement. In the embodiment illustrated in FIG. 6, the insert mounting means fixedly mounts the inserts, designated 58, to both the outer and inner baffles 30, 32. The inserts 58 are generally similar to the inserts 46 described above and include conventional impingement air holes 58a extending therethrough, but the outer and inner ends 58b and 58c of the inserts 58 extend through corresponding holes in the outer and inner baffles 48, 50. The insert outer and inner ends 58b,c may be suitably brazed or welded to the baffles 48, 50 to provide a structural loadpath between the outer and inner bands 30, 32 and for centering the insert 58 within each of the vanes 34B. In this embodiment, both the outer collar 40 and the inner collar 42B are in the form of the rope seals illustrated in FIG. 4 and resiliently mount the vanes 34B in the respective outer and inner bands 30, 32. The outer and inner ends of the vane 34B are completely open for allowing the insert 58 to extend therethrough, with the insert 58 being predeterminedly spaced inside respective ones of the vanes 34B for allowing unrestrained differential thermal movement therebetween. The individual vanes 34B are allowed to freely expand and contract radially as well as laterally in the outer and inner collars 40, 42B, without restraint by the inserts 58 extending radially therethrough. Since the floating vanes 58 themselves do not carry radial loads between the outer and inner bands 30, 32, the inserts 58 joined to the outer and inner baffles 48, 50 maintain a specific position between the outer and inner bands 30, 32.

Since the various embodiments of the vanes 34 provide free floating thereof, the outer and inner bands 30, 32 no longer need be formed as arcuate segments, but instead can be individual, continuous 360° rings, such as illustrated in the FIG. 6 embodiment. In this way, the spline seals typically required between nozzle segments are no longer required, which therefore eliminates parts and any leakage attendant therewith.

Figure 7:
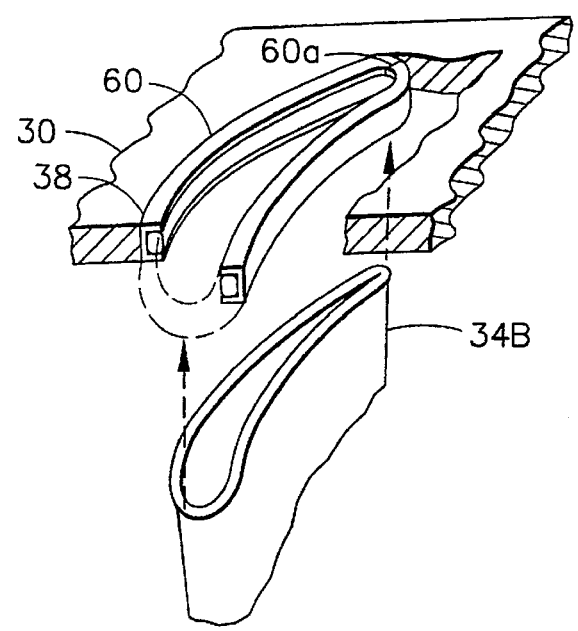
FIG. 7 is a partly sectional, isometric view of a cartridge containing a rope seal for mounting one end of the vane illustrated in FIG. 6 to corresponding ones of the outer and inner bands.

Although various configurations of the outer and inner collars may be used and mounted in various ways, FIG. 7 illustrates yet another way for mounting the outer or inner collars 40, 42 and the vanes, such as 34B. In this embodiment, also shown in FIG. 6, the vane mounting means includes a cartridge 60 which may be formed of the same material as the outer and inner bands 30, 32, which is configured for receiving respective ones of the vane outer and inner ends. Each cartridge is crescent shaped to match the outer configuration of the vane 34b and allow it to be inserted therethrough. A corresponding outer and inner collar 40, 42B is disposed or trapped in a corresponding recess within the cartridges 60. The cartridge 60 is suitably fixedly joined, by welding for example, inside the respective outer and inner mounting holes 36, 38 to position the respective collar 40, 42b through which is mounted the vane 34B.

The cartridge 60 preferably includes a single through-split 60a at one end thereof so that during assembly the cartridge may be initially bent open for inserting the corresponding rope seal, and then returning the cartridge 60 to its initial crescent shape to complement the vane 34B. The cartridge 60 is preferably assembled around the vane and into its mounting hole after the vane is in place to improve assembly and for preloading the seals. The cartridge 60 may then be welded into position in the outer and inner bands 30, 32.

In the various embodiments of the invention disclosed above, the resilient outer and inner collars 40, 42 allow the vanes to float relative to the outer and inner bands 30, 32 for allowing substantially unrestrained differential thermal expansion and contraction between these components to prevent thermal stress damage to the relatively brittle, high temperature capability vanes. The collars 40, 42 allow the vanes to slide radially under differential thermal movement, with lateral differential thermal movement being accommodated by expansion or compression of the collars due to their inherent resilience. The collars nevertheless have sufficient stiffness for reacting the considerable aerodynamic loads imposed upon the vanes by the combustion gases 26 which are in turn carried by the outer and inner bands 30, 32 to the engine frame. The resiliently mounted vanes allow additional improvement in the overall turbine nozzle which may now be manufactured using fully continuous outer and inner bands 30, 32 without the need for arcuate segmentation thereof. Accordingly, any high temperature capability vane which is inherently brittle may now be compliantly mounted into the outer and inner bands 30, 32 for effective use in a gas turbine engine turbine nozzle without thermal stress damage for enjoying a suitable useful life with enhanced efficiency of the gas turbine engine operating with higher temperature combustion gases.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A turbine nozzle comprising:
    an outer band including a plurality of circumferentially spaced apart outer mounting holes;
    an inner band spaced from said outer band and including a plurality of circumferentially spaced apart inner mounting holes;
    a plurality of vanes extending through respective pairs of said outer and inner holes, and each vane having outer and inner ends disposed correspondingly thereat, and being shaped for channeling combustion gas thereover; and
    means for resiliently supporting said vanes to said outer and inner bands for allowing differential thermal movement between said vanes and said outer and inner bands.

2. A nozzle according to claim 1 wherein said vane supporting means are effective for allowing said differential thermal movement between said vanes and said bands both radially and laterally.

3. A nozzle according to claim 2 wherein said vane supporting means comprise:
    an outer collar surrounding each of said vane outer ends in each of said corresponding outer holes in laterally abutting contact therebetween for centering said vane outer end therein; and
    an inner collar surrounding each of said vane inner ends in each of said corresponding inner holes in laterally abutting contact therebetween for centering said vane inner end therein.

4. A nozzle according to claim 3 wherein said vanes are hollow, and further comprising:
    an insert disposed inside each of said vanes for impinging air against said vanes for impingement cooling thereof; and
    means for mounting said insert to said bands to allow differential thermal movement between said vanes and said inserts.

5. A nozzle according to claim 4 wherein said insert mounting means are effective for allowing said differential thermal movement between said vanes and said inserts both radially and laterally.

6. A nozzle according to claim 5 wherein:
    each of said inserts includes outer and inner ends; and
    said inserts mounting means are effective to fixedly join at least one of said insert outer and inner ends to corresponding ones of said outer and inner bands.

7. A nozzle according to claim 6 further comprising outer and inner impingement baffles fixedly joined to respective ones of said outer and inner bands for impingement cooling thereof; and
    wherein said insert mounting means fixedly mount said insert to at least one of said outer and inner impingement baffles.

8. A nozzle according to claim 7 wherein:
    said insert mounting means fixedly mount said inserts to both said outer and inner baffles; and
    said inserts are spaced from respective ones of said vanes for allowing unrestrained differential thermal movement therebetween.

9. A nozzle according to claim 7 wherein:
    each of said vanes includes an endcap fixedly joined to one end thereof;
    each of said inserts includes an endcap fixedly joined to one end thereof; and
    said insert mounting means include a pin extending through, and fixedly joining together, said vane and insert endcaps and one of said baffles.

10. A nozzle according to claim 5 wherein said outer or inner collar comprises a rope seal having a core of bundled fibers surrounded by a sheath of braided metal fibers.

11. A nozzle according to claim 5 wherein said outer or inner collar comprises a felt of sintered metal fibers.

12. A nozzle according to claim 5 wherein said vanes are brittle relative to said outer and inner bands.

13. A nozzle according to claim 5 wherein said vanes have a substantially different material thermal response than said outer and inner bands.

14. A nozzle according to claim 13 wherein said vanes comprise an intermetallic material and have a different thermal conductivity than said bands.

15. A nozzle according to claim 13 wherein said vanes comprise a ceramic composite matrix and have a lower coefficient of thermal expansion than said bands.

16. A nozzle according to claim 15 wherein said vane mounting means include a cartridge configured for receiving one of said vane outer and inner ends, and fixedly joined to a respective one of said outer and inner mounting holes, with said corresponding outer and inner collar being disposed in said cartridge.

17. A nozzle according to claim 16 wherein said cartridge is crescent shaped to complement said vane, and includes a single split.

18. A nozzle according to claim 1 wherein said vanes are hollow, and further including means for cooling said vanes.

19. A turbine nozzle comprising:

an outer band including a plurality of circumferentially spaced apart outer mounting holes;

an inner band spaced from said outer band and including a plurality of circumferentially spaced apart inner mounting holes;

a plurality of vanes extending through respective pairs of said outer and inner holes, and each vane having outer and inner ends disposed correspondingly thereat;

means for resiliently supporting said vanes to said outer and inner bands at said outer and inner holes for allowing differential thermal movement between said vanes and said outer and inner bands; and means for cooling said vanes.

* * * * *